SAW-TOOTH WAVE FORM GENERATOR HAVING FEEDBACK MEANS TO COMPENSATE FOR LEAKAGE CURRENT OF THE CHARGING CAPACITOR

Filed March 27, 1961

George E. Brechling
INVENTOR.

BY Michael P. Breston 3,158,822

SAW-TOOTH WAVE FORM GENERATOR HAVING FEEDBACK MEANS TO COMPENSATE FOR LEAKAGE CURRENT OF THE CHARGING CAPACITOR

George E. Brechling, Levittown, Pa., assignor to Electro-Mechanical Research, Inc., Sarasota, Fla., a corporation of Connecticut Filed Mar. 27, 1961, Ser. No. 98,460
5 Claims. (Cl. 331—111)

This invention relates to saw-tooth wave form generators and more particularly to ramp generators.

It is an object of this invention to provide a new and improved ramp generator capable of producing linear ramps over relatively long time intervals.

It is another object of this invention to provide a new and improved ramp generator for producing linear ramps whose periodicity, slope, and level can be easily and independently adjusted.

It is still another object of this invention to provide a new and improved ramp generator which is self-compensating with respect to temperature changes, which employs a minimum of components, which can be economically assembled, and which operates reliably under severe physical environmental conditions such as shock and vibration.

These and other objects of this invention are obtained by providing a direct current source for linearly charging a capacitive network including one or more capacitors. When the voltage across the network reaches a characteristic value, a voltage level detector becomes actuated to substantially instantaneously discharge the capacitors. The resulting potential ramps on the network are then applied to a buffer amplifier. A slope and a level adjust circuit are coupled to the output of the buffer amplifier for affording independent variations of the slope and of the level of the output ramps. A bleeder circuit element is provided between a current adjust terminal on the current source and the output circuit of the buffer amplifier for instantaneously and automatically increasing the output of the current source by an amount sufficient to compensate for the leakage losses in the capacitors and for the small current consumed by the buffer amplifier thereby assuring steep and long linear voltage ramps.

The above and still further objects, features, and advantages of the new and improved ramp generator of the present invention will become apparent upon consideration of the following detailed description, especially when taken in conjunction with the accompanying drawings, wherein.

Figure 1:
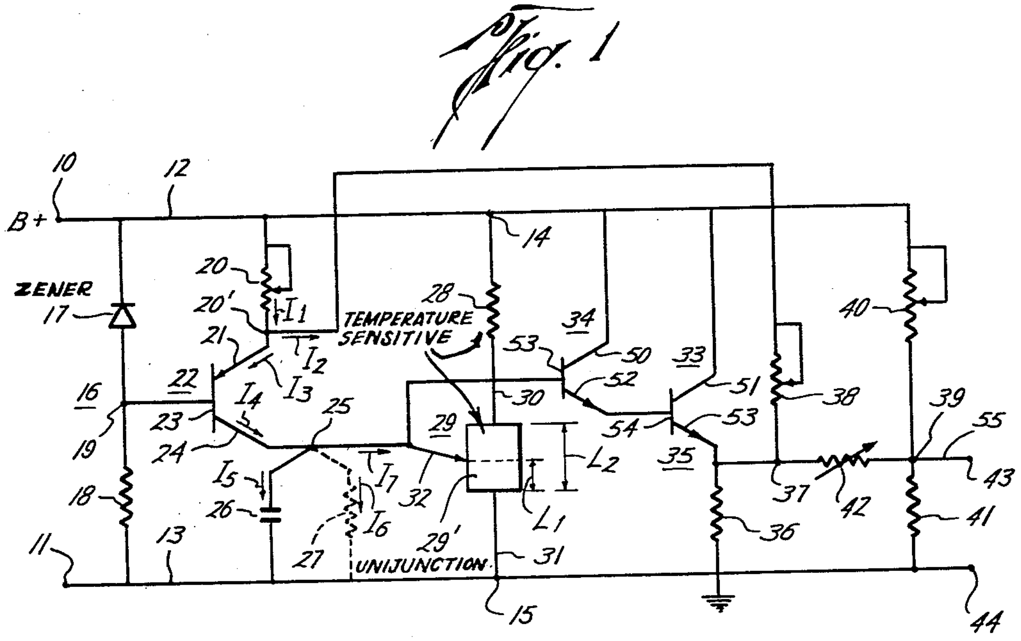
FIG. 1 is a schematic circuit diagram of a preferred embodiment of the ramp generator in accordance with this invention.

In FIG. 1, a B+ voltage supply is connected to input terminals 10, 11; terminal 11 is preferably grounded. Conductors 12, 13 connect terminals 10, 11 to junctions 14, 15 respectively. A voltage divider 16, connected across lines 12 and 13 comprises a voltage-regulating element 17 and a current-limiting resistor 18 having a common junction 19.

Figure 2:
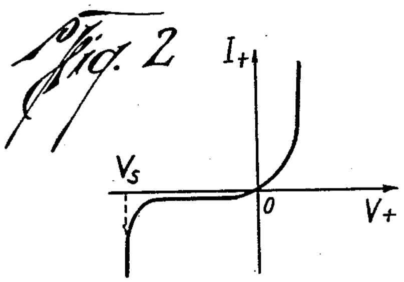
FIG. 2 is a voltage-versus-current characteristic curve of the voltage-regulating element employed in the current source of FIG. 1.

The function of element 17 is to maintain a constant potential difference between junctions 14 and 19. When this potential difference attains a characteristic value $V_s$, element 17 will thereafter maintain it substantially constant irrespective of fluctuations in the current flow through voltage divider 16. Preferably, element 17 is a Zener semiconductor junction diode, a characteristic curve of which is shown in FIG. 2. It will be noted that since $V_s$ is negative, Zener diode 17 should be poled to conduct current in the reverse direction as shown. Because $V_s$ remains substantially constant with wide variations in the flow of current through diode 17, fluctuations in the B+ voltage will not affect the potential difference between junctions 14 and 19: the fluctuations will appear across current-limiting resistor 18.

A variable resistor 20 is connected between junction 14 and the emitter electrode 21 of a PNP transistor 22 whose base electrode 23 is connected to junction 19. When transistor 22 is operated at a uniform temperature, the potential difference between emitter 21 and base 23 remains substantially constant. Therefore, the voltage drop across resistor 20 will also remain constant, causing a fixed current $I_1$ to flow into junction 20′ between resistor 20 and emitter 21. Current $I_3$, which constitutes the greatest portion of $I_1$, flows into emitter 21 and is amplified by the common base current gain of transistor 22 to provide an ouput current $I_4$ at the collector electrode 24.

When the operating temperature changes, the potential difference between emitter 21 and base 23 also tends to change. A variation in the emitter-to-base voltage results in a variation in the voltage drop across resistor 20 and, consequently, in a variation of $I_1$ and hence of $I_4$. To maintain $I_4$ constant with changing temperatures, Zener diode 17 is selected with a negative temperature coefficient such that a change in the potential difference between emitter 21 and base 23 is accompanied by an equal offsetting change in the potential across Zener diode 17, thereby maintaining $I_1$ constant.

Figure 3:
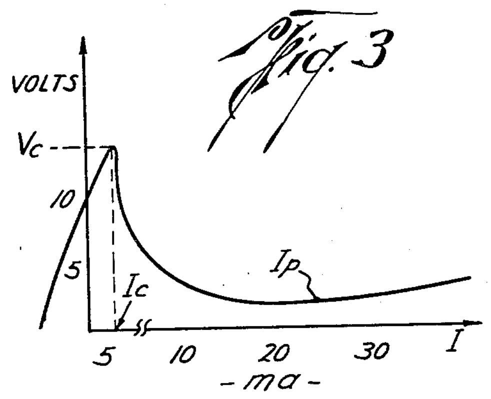
FIG. 3 is a representative, voltage-versus current characteristic curve of a bi-stable impedance control device employed in the voltage level detector of FIG. 1.

The collector electrode 24 is connected to a junction 25. A high-valued capacitor 26 is connected between junctions 25 and 15. To limit the rise in potential at junction 25 and to substantially instantaneously discharge capacitor 26, there is provided a voltage level detector 29 with a bi-stable impedance characteristic. A typical voltage-versus-current curve of a preferred detector is shown in FIG. 3. When the voltage across its terminals increases from zero to below a threshold value $V_c$, its internal resistance remains stable and very high ("off" state) of, say, 10 to 1,000 megohms; when this voltage slightly exceeds $V_c$, its resistance first becomes negative and, thereafter, it again assumes a stable but very low positive resistance ("on" state) of, say, 10 ohms or less. When the current flowing through voltage detector 29 is reduced from an operating value $I_p$ to a value below its holding current $I_c$, corresponding to its critical voltage $V_c$, the detector switches back to its stable high-impedance "off" state. Consequently, either the "on" or the "off" state of level detector 29 can be selected by merely controlling the amount of current flowing therethrough.

Several known components may be employed to perform the function of detector 29, such as unijunction transistors, four-layer Shockley diodes, controlled rectifiers, etc. Good results were obtained, in a model embodying the circuit of FIG. 1, by utilizing a unijunction transistor 29′ having two base electrodes 30, 31 and one emitter control electrode 32 connected to junction 25. Base 30 is connected to junction 14 through a current-limiting and temperature-stabilizing resistor 28, and base 31 is connected directly to junction 15. Unijunction transistor 29' has a threshold voltage $V_c$ determined by the potential difference between base electrodes 30, 31 and by the small, forward-bias, emitter-to-base voltage drop ($V_{32-31}$). Typically, the threshold voltage level is equal to 6/10 (the ratio between the emitter-to-base and the base-to-base separations $L_1/L_2$) of the potential difference between base electrodes 30, 31 plus the forward, emitter-to-base voltage drop. In other words, when the potential of junction 25 is slightly greater than 6/10 of the voltage between base electrodes 30, 31, the semiconductor material of the unijunction transistor will "break down." This forward, emitter-to-base voltage drop changes appreciably with temperature thereby varying the threshold voltage $V_c$. To compensate for the changes in $V_c$ with fluctuating temperatures, resistor 28 is selected to form a balancing voltage divided network with the transistor semiconductor material (usually silicon), the resistance of which changes with temperature. The temperature coefficients of resistor 28 and of the semiconductor material are selected such that the change in the potential of base 30, in response to a change in temperature, is sufficient to offset the base-to-emitter voltage change ($V_{32-31}$), thus maintaining the threshold voltage $V_c$ constant over an extremely wide temperature range, such as $-50°$ to $+100°$ C.

In order to isolate the ramp generating capacitor 26 from the utilization device connected to the output of the ramp generator and to prevent it from diverting a substantial portion of the current source output $I_4$, an isolation buffer amplifier 33 is provided. This amplifier when connected to junction 25 presents thereto a very high input impedance and also provides a very low output impedance of, say, 10 to 20 ohms.. Amplifier 33 preferably includes two high gain NPN transistors 34, 35 arranged as emitter-follower stages. Collectors 50, 51 are connected to the B+ terminal through lead 12. The output wave form of the voltage level detector 29, appearing on emitter 32, is applied to the input of amplifier 33. Emitter 32 is connected to base 53 of transistor 34 whose emitter 52 is in turn connected to base 54 of transistor 35. Emitter 53 of transistor 35 is connected to ground through a load resistor 36. Although two emitter-follower stages are shown, one stage or more than two stages could be employed, as will be readily understood by the man skilled in the art.

To obtain extra long ramps, it becomes necessary to employ a high-valued capacitor 26 of, say, 300 microfarads or more. Since better grade capacitors are more readily available in the lower value range, it is often desirable to connect two or more small capacitors in parallel. High-valued capacitors, typically made of tantalum, undesirably draw appreciable leakage currents. For the sake of clarity, the capacitor leakage current $I_6$ is represented as flowing into a leakage resistor 27, connected across capacitor 26 and drawn in dotted form. The magnitude of $I_6$ increases as the potential of junction 25 increases. As will be explained below, to assure a linear rise of potential with time at junction 25, it is essential that the portion $I_5$ of the output current $I_4$, flowing into capacitor 26, be maintained fixed during the entire duration of the voltage ramp.

To maintain $I_5$ constant during each ramp period in spite of an increasing leakage current $I_6$ with increasing ramp voltage, and to compensate for the small current $I_7$ which flows out of junction 25 into the voltage level detector 29 and into the buffer amplifier 33, a high-valued, variable bleeder resistor 38 is connected between the current adjust terminal 20' and the output terminal 37 of buffer amplifier 33. Resistor 38 draws a current $I_2$ which decreases as $(I_6+I_7)$ increases, thus maintaining the charging current $I_5$ substantially constant over the entire ramp duration.

To vary the slope of the output ramps a voltage divider network is connected between junction 37 and output terminal 43. It comprises a slope adjust variable resistor 42 and a fixed resistor 41 having a common junction 39. And, to independently vary the level of the output ramps, a level adjust variable resistor 40 is connected between junctions 14 and 39. Output terminal 43 is connected to junction 39 via a lead 55. The saw-tooth wave form is derived from output terminals 43 and 44.

In an exemplary operation of the ramp generator of FIG. 1, the applied B+ voltage is divided between Zener diode 17 and resistor 18. For a suitable value of the voltage supply, sufficient to break down Zener diode 17, the potential difference between junctions 14 and 19 will be fixed by the characteristic threshold voltage $V_s$ of diode 17. For a particular setting of variable resistor 20, a current $I_4$ will flow out of collector 24 into junction 25. The amplitude of $I_4$ will be negligibly affected by changes in the emitter-to-collector potential difference of transistor 22 resulting from variations in the potential of junction 25. Thus the current source, which includes Zener diode 17, resistor 20 and transistor 22, delivers a stable output current $I_4$ to charging capacitor 26.

Since the respective input impedances to unijunction transistor 29' (when it its "off" state) and to the base of transistor 34 are very high, the greatest portion of output current $I_4$ flows as $I_5$ into capacitor 26. This capacitor will integrate the charging current and the potential $v_{25}$ of junction 25 will therefore start rising with time. Since $I_5$ is constant, the instantaneous value of $v_{25}$ may be derived from the linear equation given by:

$$v_{25}=(I_5/C)t$$

where:

C is the capacitance of capacitor 26 in farads, $I_5$ is in amperes, and $t$ is in seconds. It will be appreciated that, by increasing the amplitude of the charging current $I_5$, junction 25 will reach a predetermined voltage level in a correspondingly shorter time interval, and vice versa. This can readily be accomplished by changing the value of resistor 20, thus affording a simple method for varying the duration of the output ramps, i.e., the period of the saw-tooth wave form.

Figure 4:
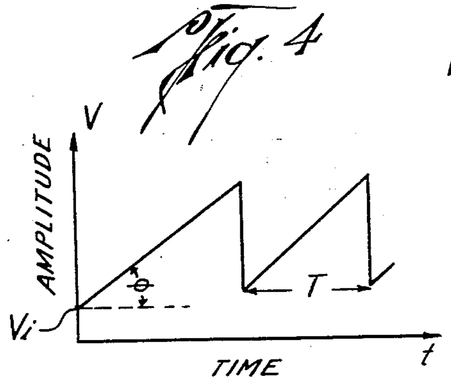
FIG. 4 is a graph of the output saw-tooth wave form of the new and improved ramp generator of FIG. 1.

Consequently, for a constant charging current $I_5$, the potential of junction 25 will rise linearly with time at a slope determined by $I_5/C$. After a certain time period T, junction 25 will reach the threshold voltage $V_c$ of unijunction transistor 29'. At the instant that the potential of junction 25 slightly exceeds $V_c$, transistor 29' breaks down and starts to heavily conduct current, thus providing a "dumping" path for the current source output $I_4$, as well as for the discharging current from capacitor 26. Moreover, due to the negative resistance characteristic immediately following the breakdown of transistor 29', the current flowing into emitter 32 increases as the potential of junction 25 decreases, thus assuring a substantially instantaneous discharge of capacitor 26. Thereafter, without being reinforced by the discharge current, the amplitude of $I_4$ is insufficient to maintain unijunction transistor 29' in its low impedance or "on" state and it rapidly reverts back to its "off" state. The ramp generator has now produced one voltage ramp and completed one cycle of operation as shown in FIG. 4. Thereafter, current $I_5$ will again start charging capacitor 26, as previously described, until the potential of junction 25 again reaches the threshold voltage level $V_c$ with the ensuing breakdown of transistor 29'. The operation becomes periodic at a frequency $f=1/T$.

In sum, a linear voltage ramp across capacitor 26 is generated for a time interval determined by the amplitude of the charging current $I_5$ and the threshold voltage $V_c$ of the bistable impedance voltage detector 29. If current $I_5$ is held constant, the ramp duration will only be a function of the values of $V_c$ and C. Since the period T is equal to $(V_c/I_5)C$, it may also be varied by varying the value of C. In a practical circuit, to provide long periods of, say, 20 seconds, a very high-valued capacitor (300 microfarads or more) is required. Such large capacitors however possess a relatively low shunt resistance 27 which consumes a large leakage current $I_6$. To compound the difficulties, this leakage current increases with increasing ramp voltage at junction 25. Since the linearity of the ramp is dependent upon the constancy of the charging current $I_5$ and, further, since the output current $I_4$ of the current source is predetermined by the setting of the variable resistor 20, the increasing leakage current $I_6$ results in an undesirable decrease of the charging current $I_5$ and in a consequent reduction of the linearity of the output ramps.

The difficulty is obviated by the shunting bleeder resistor 38 which effectively maintains the linearity of the voltage ramps in spite of increasing leakage losses. This is accomplished as follows: when capacitor 26 is completely discharged, junction 25 and, because of the emitter-follower action, junction 37 are substantially at ground potential; since resistor 38 is very large, compared to all the other resistors in the circuit, the entire B+ voltage less the $V_s$ voltage drop across Zener diode 17 appears across resistor 38; therefore, a relatively high bleeding current $I_2$ starts to flow from terminal 20' to junction 37; and, since $I_2$ subtracts from $I_3$ flowing into emitter 21, the collector current $I_4$ and hence the total current loss $(I_6+I_7)$ will be at their relatively low values. As the ramp voltage at junction 25 increases, the potential of junction 37 also increases. An increase in potential at junction 37 causes a corresponding decrease in the voltage drop across resistor 38 and, hence, a decrease in the amplitude of the bleeding current $I_2$, thereby allowing a greater collector current $I_4$ to flow into junction 25 in order to compensate for the increasing value of $(I_6+I_7)$ and to hold the magnitude of $I_5$ fixed. The tap on resistor 38 can be adjusted so as to maintain the charging current $I_5$ substantially constant with varying potentials at junction 25.

Since the buffer network 33 is connected as an emitter-follower amplifier, the voltage at the emitter 53 of transistor 35 will "follow" the voltage at the output of voltage level detector 29 which appears on the control emitter 32. The resulting voltage ramps at junction 37 form a saw-tooth wave.

By varying the value of resistor 42, the slope $\theta$ of the output ramps, as shown in FIG. 4, can be readily changed. The slope is substantially inversely proportional to the value of resistor 42. The level of the ramps, that is, the initial voltage value $V_i$ at the start of each ramp, can be adjusted by controlling the resistance value of resistor 40. The value of $V_i$ is determined by the potential of junction 39 when capacitor 26 is discharged and the voltage level detector 29 is in the "off" state. When the value of resistor 40 is high compared to the value of resistor 41, $V_i$ will be low, and vice versa. Since the potential of junction 37 increases linearly with time as the ramp progresses, the current through resistor 41 will also increase linearly with time to provide a linear ramp between output terminals 43 and 44. This ramp starts running from an initial voltage value $V_i$ for a period T determined by the value of the charging current $I_5$ and the threshold voltage $V_c$, assuming all the other parameters to be fixed.

Thus a saw-tooth wave form generator has been provided which can produce extremely long linear ramps, which is self-compensating with respect to changes in the operating potentials such as are caused by temperature variations, which maintains the linearity of the ramps in spite of increasing leakage currents, and which affords simple and independent controls for varying the slope and the level of the saw-tooth wave form.

The choice of the circuit elements employed in the preferred embodiment illustrated in FIG. 1 is subject to wide variations. Merely to exemplify the practice of the invention and not in restriction of its scope, the following set of values is given:

| | |
|---|---|
| Transistor 22 | 2N 328. |
| Transistors 34, 35 | 2N 760. |
| Unijunction transistor 29' | 2N 492. |
| Zener diode 17 | 1N 751A. |
| Resistor 18 | 2.2K. |
| Variable resistors 20, 40 | 50K. |
| Resistor 28 | 390 ohms. |
| Resistor 36 | 6.8K. |
| Resistor 38 | ≧1 megohm. |
| Resistor 41 | 27K. |
| Variable resistor 42 | 10K. |
| Capacitor 26 | 240 $\mu$f. |
| B+ voltage supply | 20 volts. |

With the foregoing parameters and with the variable resistors at their mid-points, $V_i$ was 0.3 volt; the peak value of the ramp at terminal 43 was 9 volts; the period T was 11 seconds; and the linearity of the ramp remained better than 0.25% during the entire ramp duration.

As the invention is susceptible to various modifications, it is not to be limited to the specific embodiment illustrated and described, but is of a scope defined in the appended claims.

What is claimed is:

1. A saw-tooth wave form generator comprising in combination: a charging capacitor, a variable direct current source for charging said capacitor, a voltage level detector connected to said capacitor, the detector impedance changing from a very high to a very low value when the voltage on said capacitor attains a characteristic voltage level, a load impedance, a buffer amplifier coupled between said load impedance and said capacitor, a resistive element connected between said load impedance and said current source for shunting a fraction of the current of said source, said fraction decreasing as the voltage on said capacitor increases thereby compensating for the rising leakage current in said capacitor and developing across said load impedance long linear voltage ramps forming a low-frequency, saw-tooth wave form, a voltage divider network including a first variable resistor and a fixed resistor connected in series and having a common junction, a second variable resistor one end of which is connected to said common junction and the other end is connected to a reference voltage source, the resistance value of said first variable resistor determining the slope and the resistance value of said second variable resistor determining the level of the voltage ramps appearing across said fixed resistor.

2. The saw-tooth wave form generator as set forth in claim 1 wherein said current source includes a semiconductor amplifying device having three electrodes and a Zener diode connected between two of said electrodes for maintaining a constant voltage thereacross.

3. The saw-tooth wave form generator as set forth in claim 1 wherein said current source includes a transistor having a base, an emitter and a collector, a Zener diode and a current-limiting resistor connected in series between said base and said emitter for maintaining a constant current flow in said limiting resistor.

4. A saw-tooth wave form generator comprising in combination: a transistor having a base, an emitter and a collector electrode, a voltage divider having first and second input terminals and an output terminal, a Zener diode connected between said first input terminal and said output terminal, said diode being poled to conduct current in the reverse direction, said output terminal being connected to said base electrode, a first variable resistor connected between said first input terminal and said emitter for providing a collector current when said input terminals are energized by a D.C. voltage supply, a capacitor connected between said collector electrode and said second input terminal for integrating said collector current during a time period T, a unijunction transistor having a first base, a second base, and a control emitter electrode, said control emitter being connected to said collector, means for connecting said first and second bases to said first and second input terminals, an isolating network having a high-impedance input circuit and a low-impedance output circuit, means to couple said control emitter to said input circuit, a second variable resistor connected between said output circuit and said first variable resistor for regulating said collector current as a function of the potential on said control emitter, thereby compensating for the leakage current in said capacitor and providing to said output circuit long linear ramps forming a low-frequency, saw-tooth wave form of period T.

5. A saw-tooth wave form generator comprising: a transistor having a base, an emitter, and a collector electrode, a voltage divider having a first and a second input terminal and one output terminal, a Zener diode poled to conduct current in the reverse direction connected between said first input terminal and said output terminal, said output terminal being connected to said base, a resistor connected between said first input terminal and said emitter for providing a constant collector current when said input terminals are energized by a B+ voltage source, a capacitor connected between said collector and said second input terminal for integrating said collector current during a time period T, a unijunction transistor having a first base, a second base, and a control emitter, means connecting said capacitor to said control emitter, a resistor connected between said first base and said first input terminal, said second base being connected to said second input terminal, an emitter-follower amplifier having a high-impedance input circuit and a low-impedance output circuit, means coupling said control emitter to said input circuit, a load impedance connected in said output circuit, a first, second, and third variable resistors and a fixed resistor, means connecting said first variable resistor between said load impedance and said first-mentioned emitter for controlling the amplitude of said collector current, means connecting said second variable resistor and said fixed resistor across said load impedance, and means connecting said third variable resistor between said first input terminal and the junction between said second variable resistor and said fixed resistor, the resistance values of said second and said third variable resistors controlling respectively the slope and the level of the saw-tooth wave form appearing across said fixed resistor.

References Cited in the file of this patent

UNITED STATES PATENTS

| | | |
|---|---|---|
| 2,661,420 | Woodruff | Dec. 1, 1953 |
| 3,007,055 | Herzfeld | Oct. 31, 1961 |

OTHER REFERENCES

Millman and Taub: Pulse and Digital Circuits, McGraw-Hill Book Co., Inc. (1956), page 209, TK7835 M55.

Shea: Transistor Circuit Engr., John Wiley & Sons, Inc. (1957), page 265. TK7872 T7355tr.

Puckle: Time Bases, Second Edition, John Wiley & Sons, Inc. (1955), page 132. TK381P9.